7451X
C. F. Fisher,
Edging Sheet-Metal.
Patented Feb. 28, 1833.
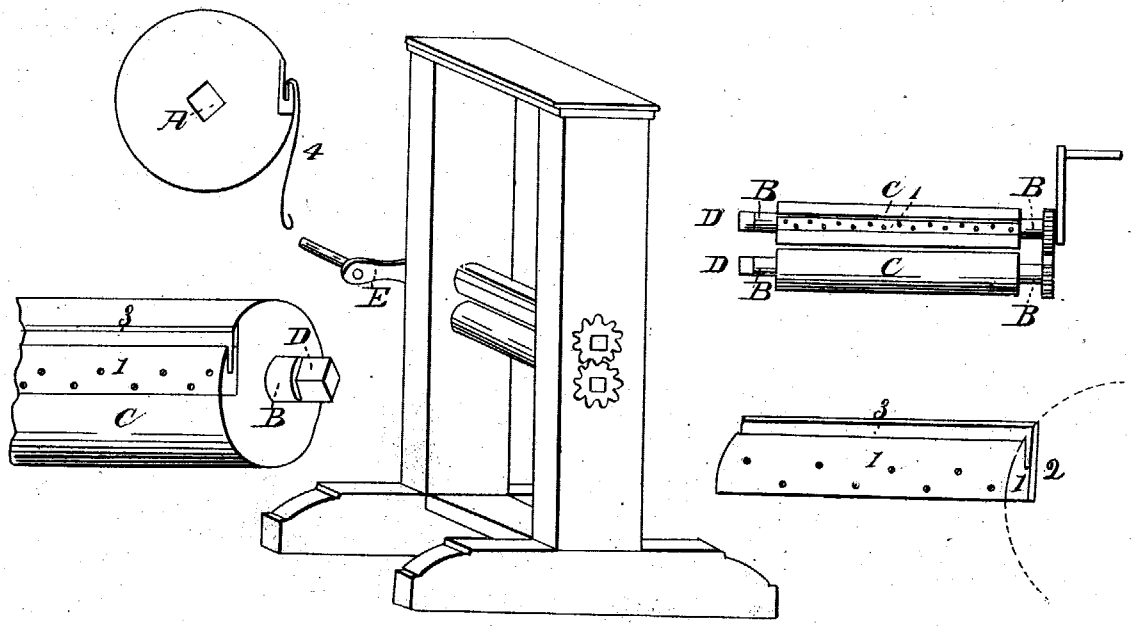
N. PETERS, PHOTO-LITHOGRAPHER, WASHINGTON, D. C.

7451X Charles F. Fisher.
Letters Patent.

The Schedule referred to in these Letters Patent, and making part of the same containing a description in the words of the said Charles F. Fisher himself, of his Improvement in the Machine for edging or grooving Tin Plate, Sheet Iron, Sheathing Copper &c.

The utility of this Edging Iron or Grooving Roller is, that a man and boy can in one hour turn the edge upon as much sheet iron, tin plate, sheathing copper, &c, as six men can by the common mode in the same time; and with more ease, and in a more complete and workmanlike manner. This edging iron, or Grooving Roller, is placed under a plain roller of the same size, in any kind of frame, leaving a space between the upper and lower roller of ½ inch. It would be proper to have a cog wheel to each roller, when the one is turned, that the other may move with the same velocity. The rollers I have in use have each a wooden lever, three feet long. When I edge or groove, I have a small boy to turn the plain roller.

Explanation of the size of the rollers: they may be made of any size to suit the work that is intended to be edged or grooved; the ones I have in use are as described.

A, is the four square end 2 inches thick, to which the lever B three feet long is fastened to turn the roller.

B, is the gudgeon 2 inches thick on which the roller is turned.

C, is the Roller 3½ inches thick, twenty eight inches long — or any thickness that will not spring.

D, is the end gudgeon of the roller 2 inches long & 2 inches thick.

No 1, A plate of iron as long as the roller, 2 inches broad and [illegible] inch thick the outside rounded the same as the roller, the inside flat, with an offset [illegible] inch wide [illegible] inch deep to form a groove No 2. is a flat plate of iron rivetted to the plate No 1 to form the groove to put in the sheet iron &c that is to be edged. If the roller C is made of iron, then the plate No 2, can be dispensed with: — this plate

[illegible]

558. 7451X

No2. can be dispensed with is only made use of when the roller is made of wood.

No3. Represents the groove, [illegible] inch wide [illegible] inch deep, in which sheet iron, tin plate copper, &c. is put, that is to be grooved.

No4. is the screw that fastens the plates No1 & No2, to the Roller.

No5. is the sheet iron, tin, copper, &c, that the edge is to be turned on, & represents the manner it is put into the Roller. When the roller is turned, & the edge turned on the iron, tin, copper, &c the rollers are turned back & the iron, tin, copper, &c. taken out and the opposite edge is put in and rolled as before.

No6. the iron rivits by which the plate No1 & No2 are rivetted together before they are screwed to the roller.

No7. is a piece of sheet iron, tin, copper &c, after it is edged.

Charles F. Fisher claims the exclusive right of an Edging Iron & Grooving Roller — in which the tin plate, sheet iron, sheathing copper &c. is put and the edge turned in one or two operations from one extremity of the tin, iron, copper &c, to the other. He also claims the right of the use of the Rollers for Edging.

Witnesses.
Jacob A. Fisher.
Zachariah Spangler.

Charles F. Fisher.

(675 words) Patented 28. Feb. 1833.)

Rec'd & Recorded anew Tenth March 1841. & Exd. [illegible]

[illegible] in [illegible]

[illegible] Words
[illegible]